(12) United States Patent
Alexander et al.

(10) Patent No.: US 7,941,618 B2
(45) Date of Patent: *May 10, 2011

(54) FULLY BUFFERED DIMM READ DATA SUBSTITUTION FOR WRITE ACKNOWLEDGEMENT

(75) Inventors: James W. Alexander, Aloha, OR (US);
Rajat Agarwal, Beaverton, OR (US);
Bruce A. Christenson, Forest Grove, OR (US); Kai Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 12/202,088

(22) Filed: Aug. 29, 2008

(65) Prior Publication Data
US 2008/0320249 A1 Dec. 25, 2008

Related U.S. Application Data

(63) Continuation of application No. 11/321,322, filed on Dec. 28, 2005, now Pat. No. 7,444,479.

(51) Int. Cl.
*G06F 12/16* (2006.01)
(52) U.S. Cl. .................. 711/154; 711/167; 711/E12.04
(58) Field of Classification Search .................. 711/154, 711/168
See application file for complete search history.

(56) References Cited

U.S. PATENT DOCUMENTS

| | | | |
|---|---|---|---|
| 7,444,479 B2 * | 10/2008 | Alexander et al. | 711/154 |
| 2003/0061365 A1 * | 3/2003 | White et al. | 709/229 |
| 2004/0004857 A1 | 1/2004 | Manea | |
| 2005/0066137 A1 | 3/2005 | Jeddeloh et al. | |
| 2005/0066141 A1 | 3/2005 | Choi | |
| 2005/0108489 A1 | 5/2005 | Ellis | |
| 2005/0172084 A1 | 8/2005 | Jeddeloh | |
| 2006/0026375 A1 | 2/2006 | Christenson et al. | |
| 2006/0036638 A1 | 2/2006 | Osanai et al. | |
| 2006/0200597 A1 | 9/2006 | Christenson et al. | |
| 2007/0011562 A1 | 1/2007 | Alexander et al. | |
| 2007/0089032 A1 | 4/2007 | Alexander et al. | |
| 2007/0089035 A1 | 4/2007 | Alexander et al. | |

FOREIGN PATENT DOCUMENTS

WO WO 2004/109712 12/2004

OTHER PUBLICATIONS

Infineon Technologies, Intel Dual-Channel DDR Memory Architecture White Paper; Rev. 1.0, Sep. 2008; 14 pages.
FB-DIMM Draft Specification: Architecture and Protocol, JEDEC Standard No. xx-x, Nov. 2, 2006, pp. 1-116 and appendices, Revision No. 0.1 publihsed in U.S. Appl. No. 11/120,913.
FB-DIMM Draft Specification: Architecture and Protocal, JEDEC Standard No. xx-x, Nov. 2, 2006, pp. 1-116 and appendices, Revision No. 0.1a, Included JEDEC Ballot Comments, published in U.S. Appl. No. 11/120,913.

* cited by examiner

*Primary Examiner* — Matt Kim
*Assistant Examiner* — Hal Schnee
(74) *Attorney, Agent, or Firm* — Marger Johnson & McCollom, P.C.

(57) ABSTRACT

A memory controller uses a scheme to retire two entries from a replay queue due to a single non-error response. Advantageously, entries in a replay queue may be retired earlier than conventional systems, minimizing the size of the replay queue.

13 Claims, 5 Drawing Sheets

FULLY BUFFERED DIMM READ DATA SUBSTITUTION FOR WRITE ACKNOWLEDGEMENT

CROSS-REFERENCE TO RELATED APPLICATIONS

This application is a continuation of U.S. application Ser. No. 11/321,322, which was filed on Dec. 28, 2005, and which is incorporated by reference in its entirety for all purposes.

FIELD OF THE INVENTION

This present invention relates generally to memory systems, components, and methods, and more particularly to fully buffered memory controllers that efficiently retire entries in a replay queue.

BACKGROUND OF THE INVENTION

Conventional computer memory subsystems are often implemented using memory modules. A computer circuit board is assembled with a processor having an integrated memory controller, or coupled to a separate memory controller. The processor having the integrated memory controller or the separate memory controller is connected by a memory bus to one or more memory module electrical connectors (the bus may also connect to additional memory permanently mounted on the circuit board). System memory is configured according to the number of and storage capacity of the memory modules inserted in the electrical connectors.

As processor speeds have increased, memory bus speeds have been pressured to the point that the multi-point (often referred to as "multi-drop") memory bus model no longer remains viable. Referring to FIG. 1, one current solution uses a "point-to-point" memory bus model employing buffered memory modules. In FIG. 1, a computer system 100 comprises a host processor 105 communicating across a frontside bus 108 with a memory controller 110 that couples the host processor to various peripherals (not shown except for system memory). Memory controller 110 communicates with a first buffered memory module 0 across a high-speed point-to-point bus 112. A second buffered memory module 1, when included in system 100, shares a second high-speed point-to-point bus 122 with first memory module 0. Additional high-speed point-to-point buses and buffered memory modules can be chained behind memory module 1 to further increase the system memory capacity.

Buffered memory module 0 is typical of the memory modules. A memory module buffer (MMB) 146 connects module 0 to a host-side memory channel 112 and a downstream memory channel 122. A plurality of memory devices (Dynamic Random Access Memory Devices, or "DRAMs" like DRAM 144, are shown) connect to memory module buffer 146 through a memory device bus (not shown in FIG. 1) to provide addressable read/write memory for system 100.

As an exemplary memory transfer, consider a case in which processor 105 needs to access a memory address corresponding to physical memory located on memory module 1. A memory request issues to memory controller 110, which then sends a memory command, addressed to memory module 1, out on host memory channel 112. Memory controller 110 also designates an entry 115 corresponding to the memory command into replay queue 111. Prior entries corresponding to prior memory commands may be ahead of entry 115 in queue 111.

For tractability reasons, entry 115 may be retired from the queue 111 only after two conditions are met. First, memory controller 110 only retires an entry after a corresponding non-error response is received. Second, memory controller 110 only retires an entry if all prior entries have been retired.

The MMB 146 of buffered memory module 0 receives the command, resynchronizes it, if necessary, and resends it on memory channel 122 to the MMB 148 of buffered memory module 1. MMB 146 detects that the command is directed to it, decodes it, and transmits a DRAM command and signaling to the DRAMs controlled by that buffer. If the memory transfer was successful, MMB 148 sends a non-error response through memory module 0 back to memory controller 110. Memory controller 110 retires entry 115 from replay queue 111 after the non-error response is received, but only if all prior entries have also been retired.

Due to economies, the size of the replay queue 111 is limited. Therefore, entries need to be retired as quickly as possible. Due to northbound bandwidth limitations of high-speed point-to-point bus 112, receipt of non-error responses such as write acknowledges may be delayed. Delayed receipt of such a write acknowledgement may in turn delay the retirement of subsequent entries that were entered into replay queue 111 after entry 115. The delayed retirement of an entry and subsequent entries limits the amount of space available in replay queue 111 for new entries.

Because of the forgoing limitations, the amount of free space in replay queues of memory controllers is limited. The disclosure that follows solves this and other problems.

DETAILED DESCRIPTION

Figure 1:
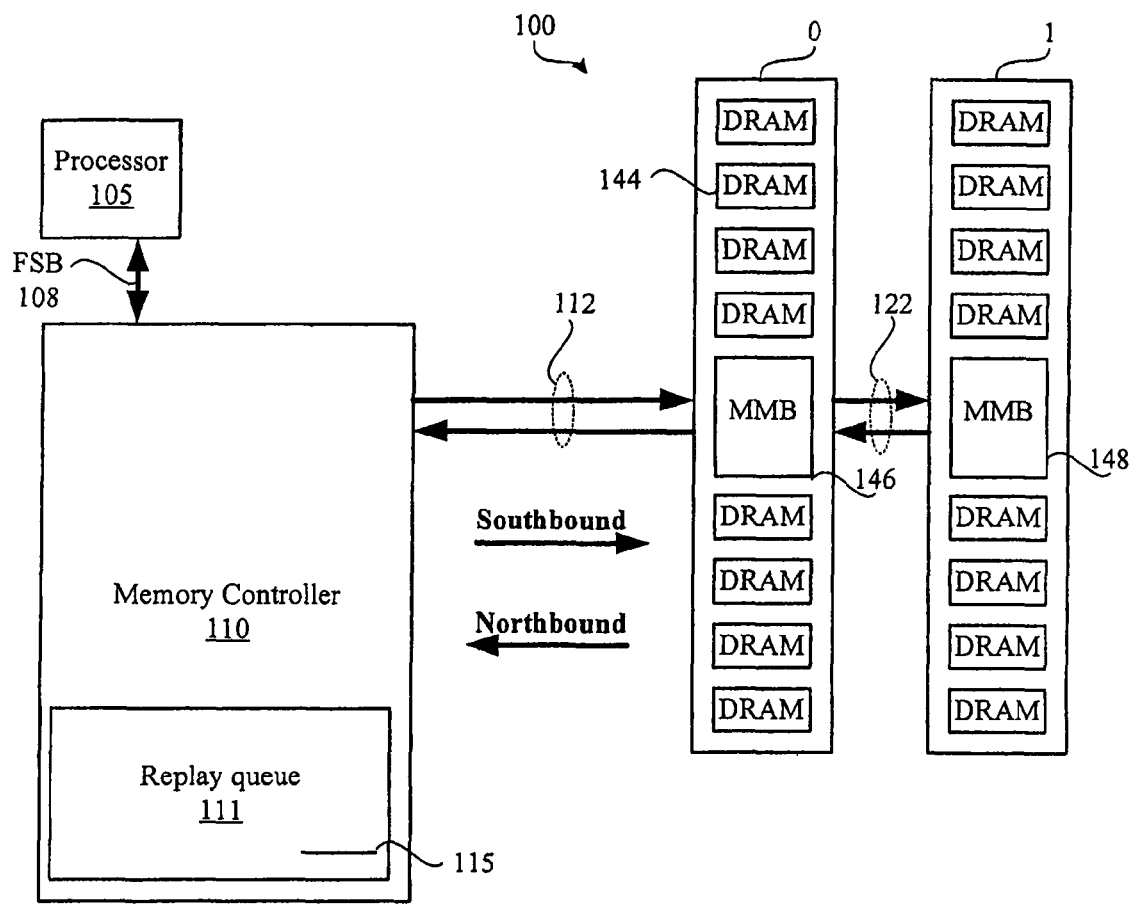
FIG. 1 is a diagram showing a conventional memory controller.
Figure 2:
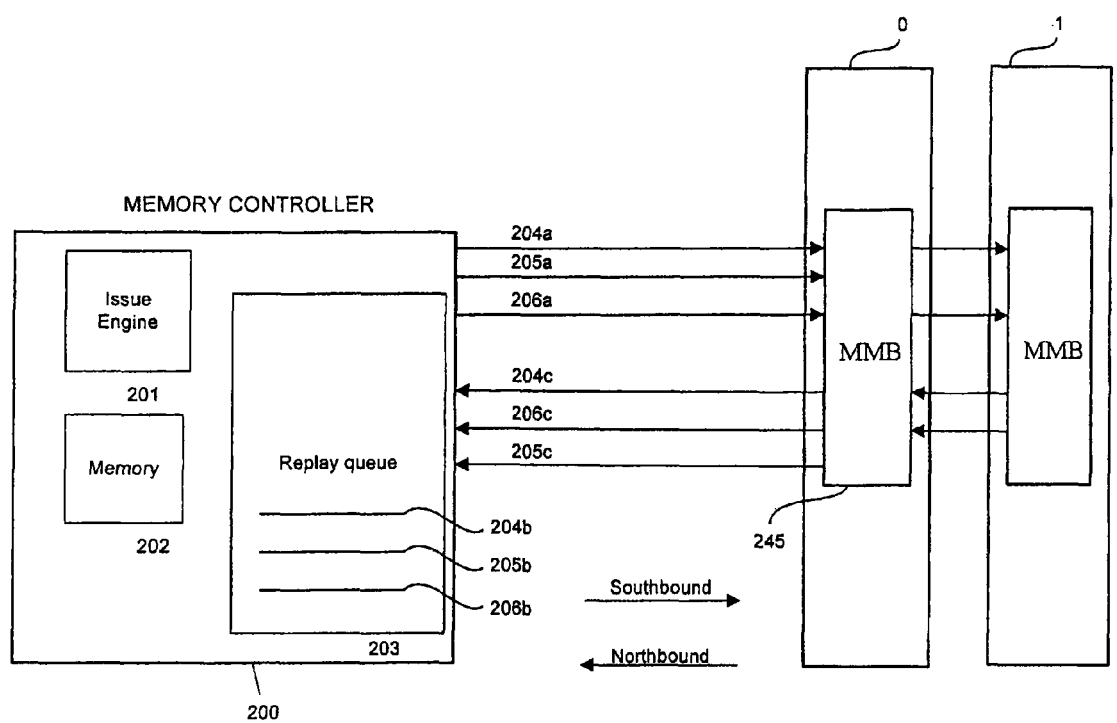
FIG. 2 is a diagram of a memory controller that retires two entries from a replay queue in response to a single non-error response.

FIG. 2 shows one example of a memory controller 200 that retires two replay queue entries according to a single non-error response. The memory controller 200 includes an issue engine 201, a memory 202 and a replay queue 203. The issue engine 201 performs the functions described in the flowcharts of FIG. 3. The timing of the signals shown in FIG. 2 is depicted in the timing diagram in FIG. 4a.

Memory controller 200 sends memory command 204a to memory module 1. In this example memory command 204a is a burst length eight read command including a starting address for a multicycle read operation. In other examples memory command is any type of read command. An entry 204b corresponding to memory command 204a is created in replay queue 203. Upon receiving memory command 204a, memory module 1 starts reading data beginning with the start address. As memory module 1 is reading data, it sends back the read data in non-error memory response 204c.

Next memory controller 200 sends memory command 205a to memory module 0 that is north of memory module 1. In this example memory command 205a is a burst length four write command that provides write data to memory module 0 during four successive strobes. In other examples memory command 205a is any type of write command. An entry 205b corresponding to memory command 205a is created in replay queue 203. Entry 205b is a consecutive entry with respect to entry 204b. Upon receiving memory command 205a, memory module 0 begins writing the data provided with memory command 205a. Memory module 0 begins writing data concurrently with memory module 1 reading data according to memory command 204b.

Memory controller 200 sends memory command 206a to memory module 1 that is south of memory module 0. Memory command 206a is a burst read command similar to memory command 204a. An entry 206b corresponding to memory command 206a is created in replay queue 203.

Memory module 0 finishes writing data according to the burst length four write command 205a. However, since memory module 1 is still sending read data via Memory Module Buffer (MMB) 245 of memory module 0 there is no bandwidth available for memory module 0 to send a non-error response 205c. The non-error response 204c including the read data consumes all of the bandwidth in the northbound direction. Accordingly, the memory controller 200 does not observe a non-error response including a write acknowledgement at this time.

After data is read according to memory command 204a, memory module 1 begins reading data according to memory command 204c. As memory module 1 is reading data, it sends back the read data in non-error memory response 206c. Non-error response 206c consumes all of the bandwidth in the northbound direction and is sent immediately after non-error responses 204c. According to conventional FBD protocol, memory controller 200 must continue to wait to observe non-error response 205c until bandwidth is available. As used within the specification, the FBD protocol refers to, for example, any revision of the FBD specification on the JEDEC website. Non-error response 205c may include explicit signals such as idle patterns or write acknowledgements.

Memory controller 200 receives non-error response 204c. Entry 204b is retired from the replay queue 203 because there are no prior entries pending. Although memory controller 200 has not received an explicit non-error response 205c corresponding to entry 205b, memory controller 200 may also retire entry 205b in response to non-corresponding non-error response 204c. This is in contrast to conventional FBD protocol where memory controller 200 must continue to wait for non-error response 205c. Thus two entries may be retired in response to a single non-error response 204c.

Entry 205b may be retired upon receipt of non-corresponding non-error response 204c because of the following occurrences. First, entry 205b corresponds to a write to a memory module that is north of a memory module that was read. Second, the write occurs concurrently with the read from the southern memory module. Third, an alert corresponding to memory command 205a was not received. An alert corresponding to memory command 205a would have taken priority over non-error response 204c. Accordingly, the receipt of non-error response 204c implicitly signals memory controller 200 that an alert was not issued and that memory command 205a must have been successful. Thus, entry 205b may be advantageously retired early before a corresponding non-error response 205c is received.

Next non-error response 206c is received. Entry 206b may advantageously be retired immediately because there are no prior entries in memory queue 203. Had memory controller 200 waited for a corresponding non-error response 205c before retiring entry 205b, prior entry 205b would exist causing a delay in retiring 206b. Thus memory controller 200 retires entries 205b and 206b early compared to a conventional memory controller.

Finally, non-error response 205c including a write acknowledgement may be received. Since memory controller 200 has already been signaled that memory command 205a was successful, memory controller 200 may forgo observation of explicit non-error response 205c. Optionally forgoing explicit write acknowledgement 205c due to the presence of the aforementioned occurrences advantageously increases southbound occupancy. The increase in southbound occupancy increases maximum bandwidth by as much as 50% over conventional systems with similar replay queue limitations.

Figure 3:
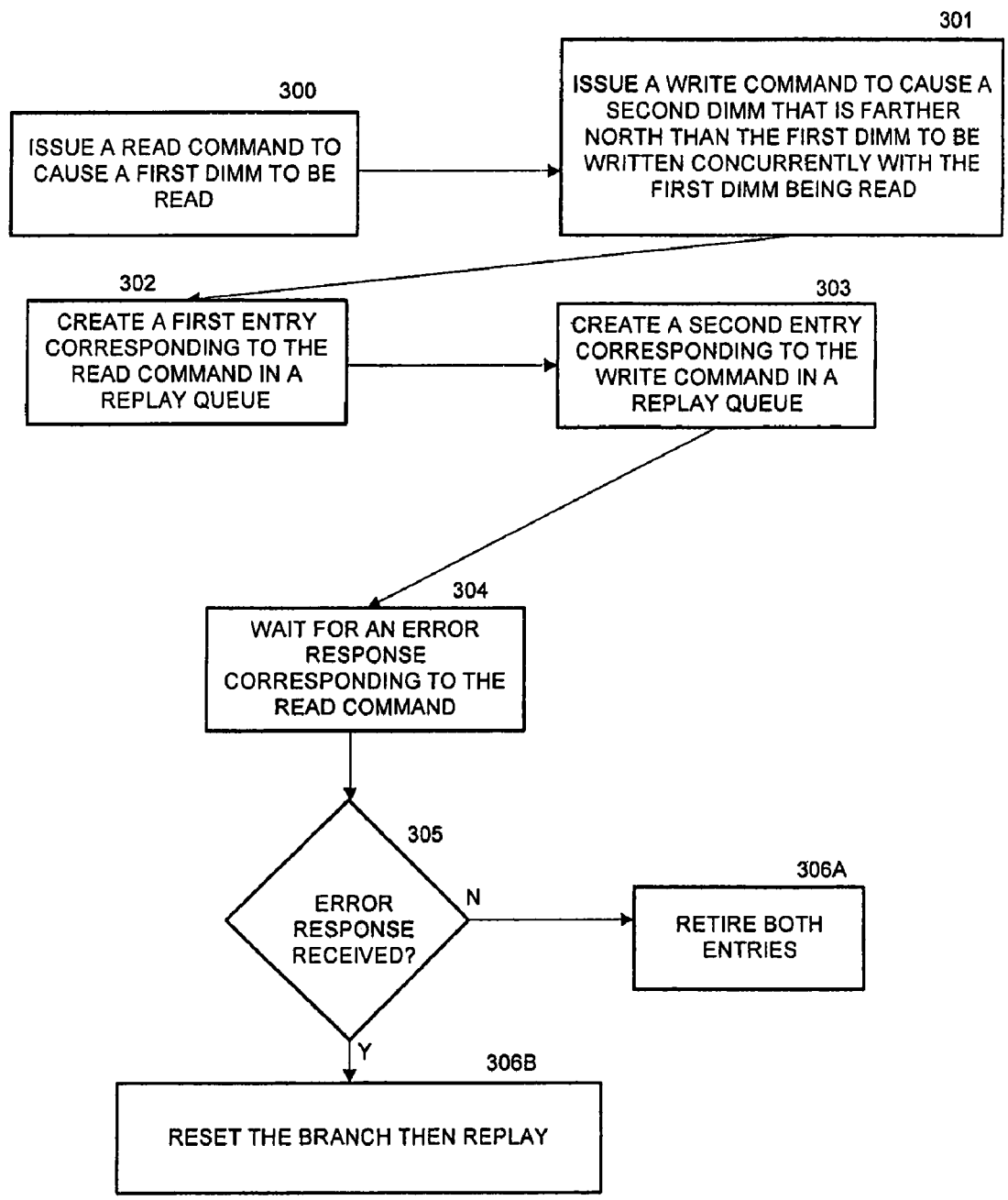
FIG. 3 is a flowchart showing how the memory controller of FIG. 2 retires the entries.

The above process is illustrated in a flowchart in FIG. 3. Referring to FIG. 3, the memory controller 200 issues a read command to cause a first memory module to be read in block 300. In block 301, a write command is issued to cause a second memory module that is farther north than the first memory module to be concurrently written. Next the memory controller 200 creates a first entry corresponding to the read command in a replay queue 203 in block 302. In block 303 a second entry is created corresponding to the write command.

Next, in block 304 the memory controller 200 waits for a non-error response corresponding to the read command. If the non-error response is received in block 305, the memory controller 200 retires both entries in block 306A. If the non-error response is not received, in block 306B memory controller 200 resets the branch and then replays the contents of replay queue 203.

Figure 4A:
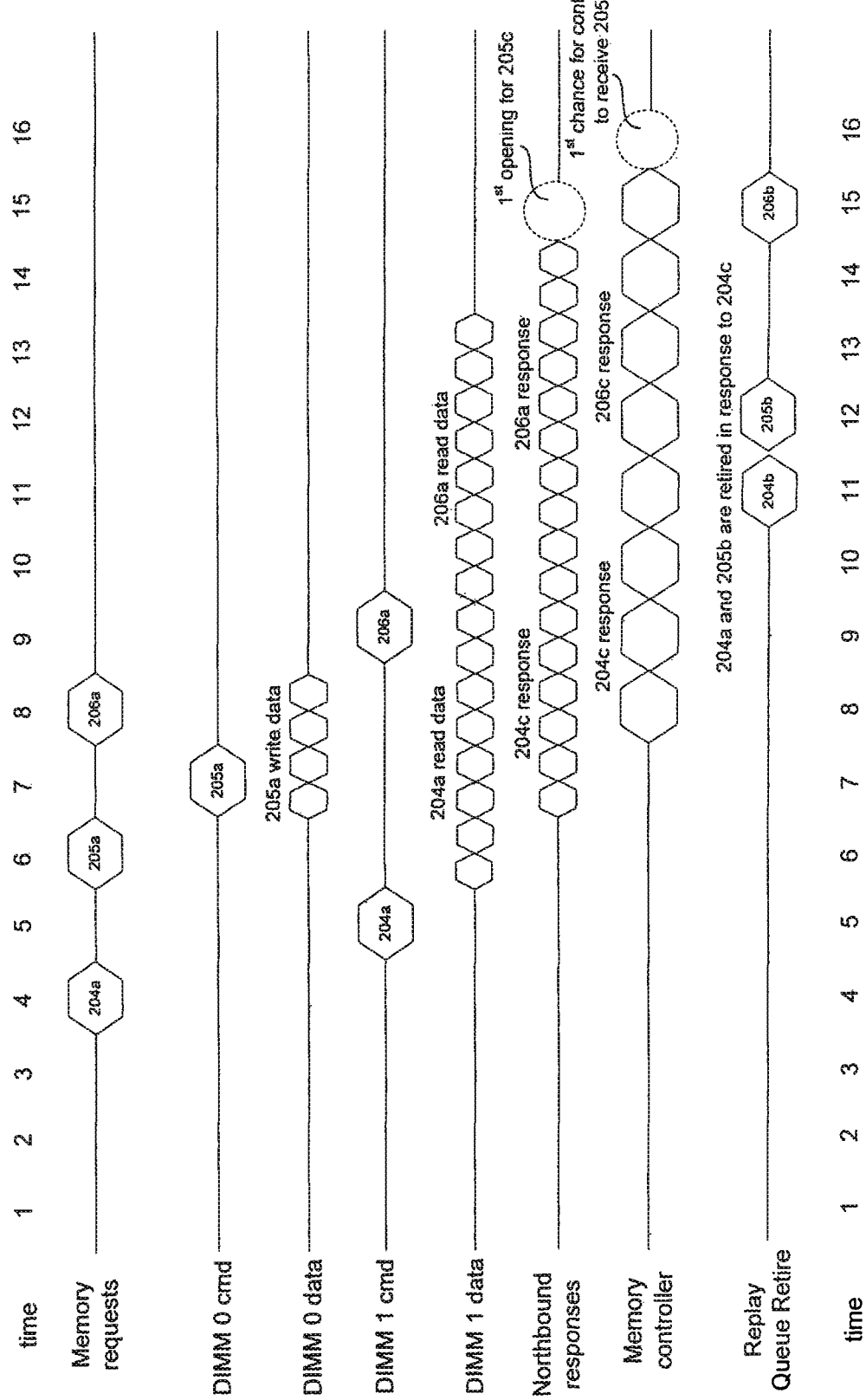
FIG. 4A is a timing diagram showing the operation illustrated in FIG. 2.

FIG. 4A shows a timing diagram for the system illustrated in FIG. 2. DIMM 1 receives a read command 204a from memory controller 200 and begins reading data at T6. DIMM 0 receives a write command 205a and begins writing data at T7 concurrently with DIMM 1 reading data. As DIMM 1 is reading data a transmission 204c from DIMM 1 begins at T7. Transmission 204c continues up to T10, thereby preventing the memory controller 200 from immediately observing an explicit write acknowledge 205c.

Meanwhile, DIMM 1 receives a read command 206a from memory controller 200 at T9 and begins reading. Immediately after DIMM 1 completes transmission 204c, transmission 206c begins at T11. Memory controller 200 is still unable to observe an explicit write acknowledgement 205c because transmissions 204c and 206c consume all of the northbound bandwidth.

Meanwhile, memory controller 200 starts receiving the read data transmission 204c from DIMM 1 at T8. When the transmission is completed at T11, memory controller 200 retires entry 204b from the replay queue 203. Memory controller 200 also retires entry 205b from the replay queue 203 in response to receiving non-corresponding non-error response 204c. Non-corresponding non-error response 204c was not sent in response to memory command 205a and does not correspond to entry 205b. Nonetheless, entry 205b is retired. Finally, at T15 memory controller 200 receives non-error response 206c and retires entry 206b.

It is not necessary for memory controller 200 to observe write acknowledge 205c at a first opening T15. Bandwidth may be saved for other transmissions by forgoing explicit observation of write acknowledge 205c.

Figure 4B:
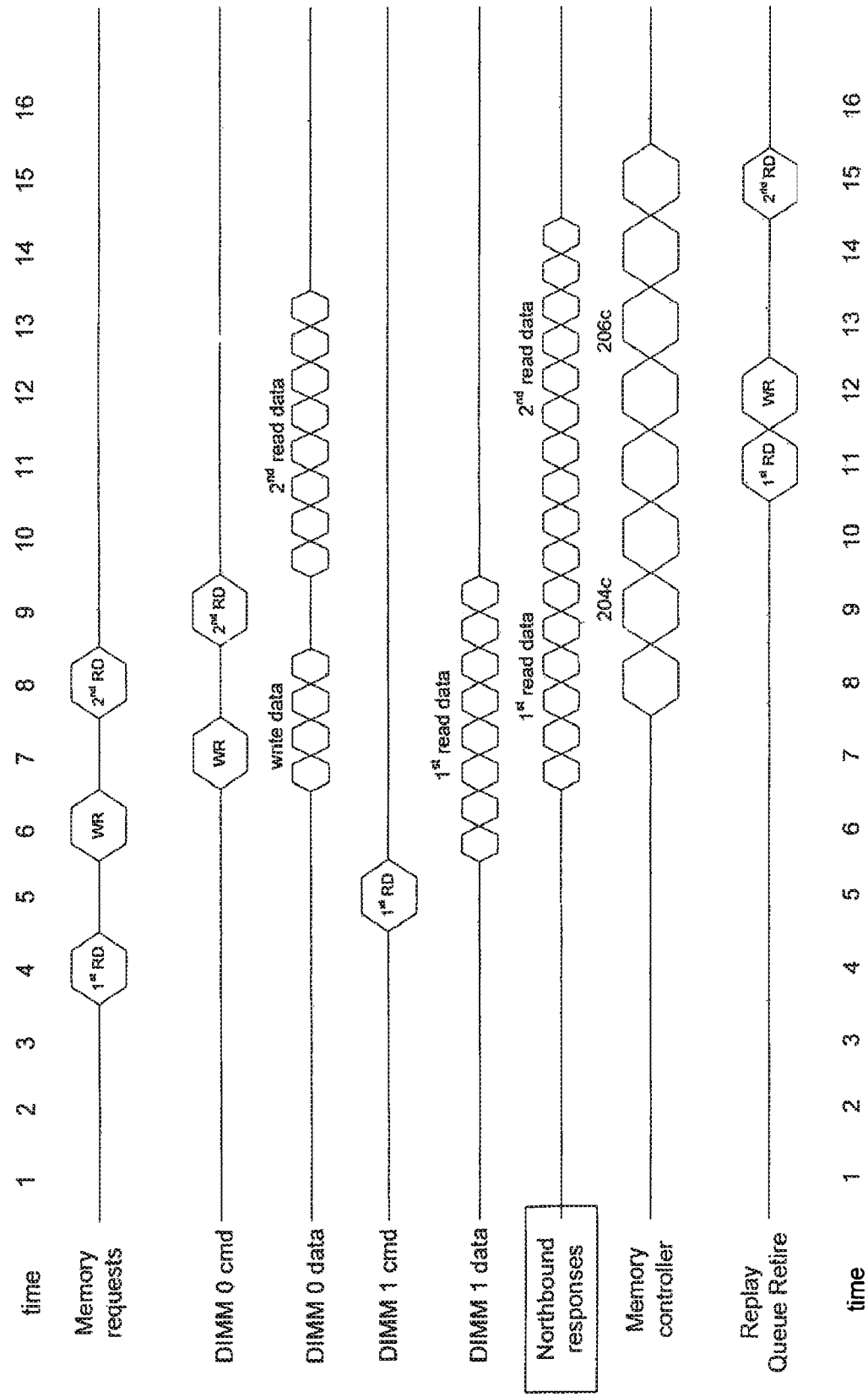
FIG. 4B is a timing diagram showing an alternative operation of the memory controller of FIG. 2.

FIG. 4B shows a timing diagram according to a different series of transmissions than illustrated in FIG. 2. The memory controller 200 causes DIMM 1 to start a first read T6 and DIMM 0 to start writing data at T7. The memory controller 200 also causes DIMM 0 to start a second read at T10.

Memory controller 200 begins receiving a non-error response corresponding to the first read at T8. When the complete non-error response corresponding to the first read is received at T11, entries associated with the first read and the write are both retired. In other words, the entry associated with the write is retired in response to a non-corresponding non-error response. Finally, the memory controller 200 retires an entry associated with the second read at T15.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A memory controller comprising:
control logic to retire a first entry and a second entry in a retirement queue in response to a first response corresponding to the first entry sent from a memory module over a point-to-point memory bus before the second entry would have been retired in response to a second response corresponding to the second entry;
wherein the first response does not correspond to the second memory command.

2. The memory controller of claim 1, wherein the control logic is further configured to retire the second entry without waiting for a non-error response corresponding to second entry.

3. The memory controller of claim 1, wherein the control logic is further configured to forgo observation of a non-error response corresponding to the second entry after retiring the second entry.

4. The method of claim 1, wherein the control logic is further configured to retire the first entry and the second entry at substantially a same time in response to the first response.

5. The memory controller of claim 1, the memory module referred to as a first memory module, wherein:
the first entry corresponds to a first memory command to cause the first memory module to read; and
the second entry corresponds to a second memory command to cause a second memory module to write.

6. The memory controller of claim 1 wherein the first response includes data read from the memory module.

7. A method comprising:
sending a first memory command causing a first memory module to read;
sending a second memory command causing a second memory module to write, the second memory module being farther north than the first memory module;
designating a first queue entry corresponding to the first memory command and a second queue entry corresponding to the second memory command; and
retiring the first queue entry and the second queue entry in response to a first response originating from the first memory module before the second entry would have been retired in response to a second response from the second memory module corresponding to the second entry;
wherein the first response does not correspond to the second memory command.

8. The method of claim 7 wherein the first response includes data read from the first memory module.

9. The method of claim 7, wherein a write acknowledgement in response to the second memory command is not received before retiring the second entry.

10. A system comprising:
control logic to send a first memory command to a first memory module;
the first memory module to read in response to the first memory command;
the control logic to send a second memory command to a second memory module, the second memory module being farther north than the first memory module;
the second memory module to write in response to the second memory command;
the control logic to designate a first queue entry corresponding to the first memory command and a second queue entry corresponding to the second memory command; and
the control logic to retire the first queue entry and the second queue entry in response to a first response originating from the first memory module before the second queue entry would have been retired in response to a second response originating from the second memory module;
wherein the first response does not correspond to the second memory command.

11. The system of claim 10, wherein the first response includes data read from the first memory module.

12. The system of claim 10, wherein the control logic is further configured to retire the second queue entry without waiting for a non-error response corresponding to second queue entry.

13. The system of claim 10, wherein the control logic is further configured to forgo observation of a non-error response corresponding to the second queue entry after retiring the second queue entry.

* * * * *